July 31, 1951 W. L. SNYDER 2,562,338
POTATO HARVESTING ATTACHMENT FOR TRACTORS
Filed May 15, 1947 3 Sheets-Sheet 2
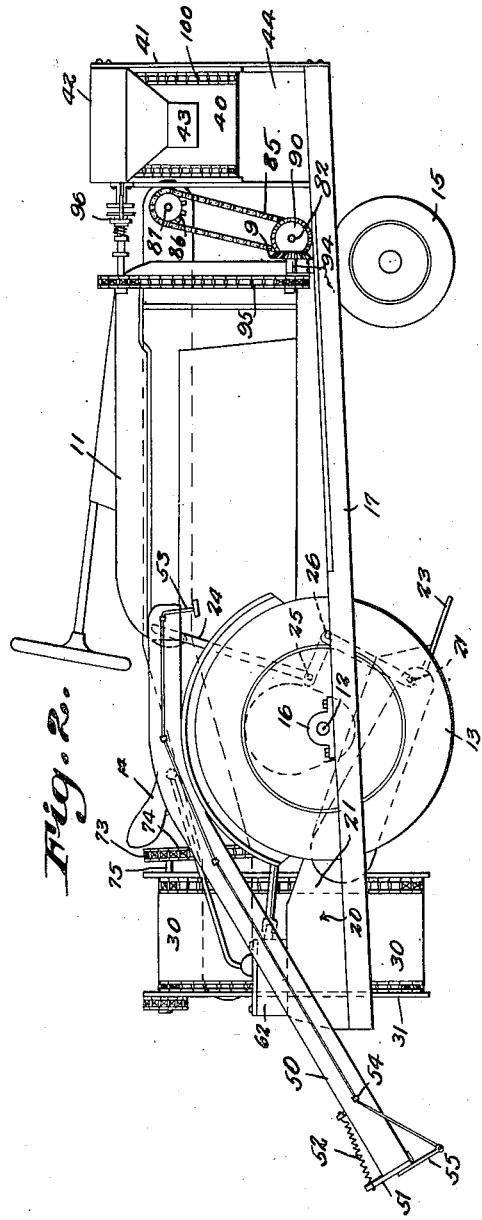
W. L. Snyder
INVENTOR
BY C. A. Snow &Co.
ATTORNEYS.

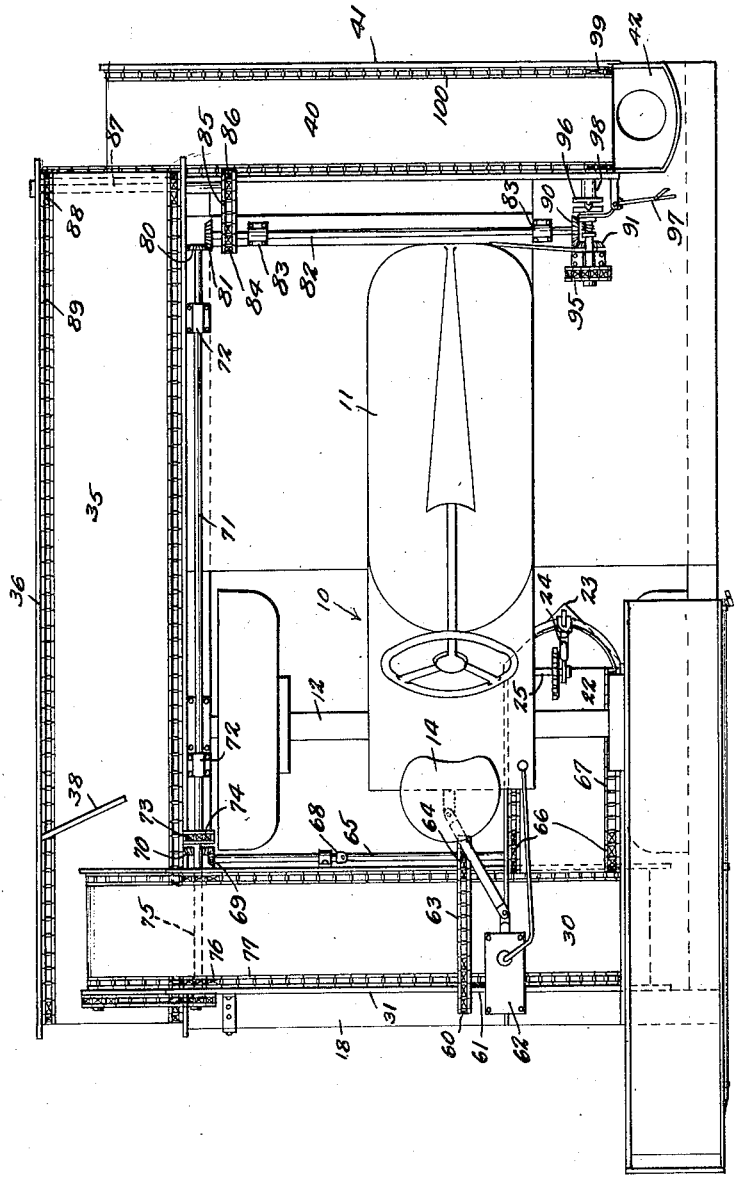

July 31, 1951  W. L. SNYDER  2,562,338
POTATO HARVESTING ATTACHMENT FOR TRACTORS
Filed May 15, 1947  3 Sheets-Sheet 3
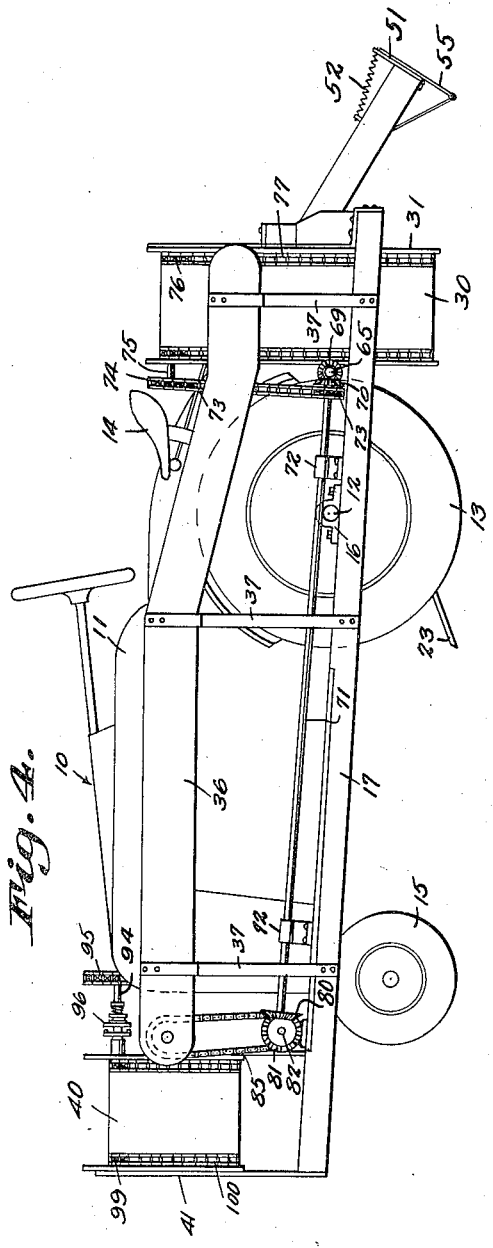
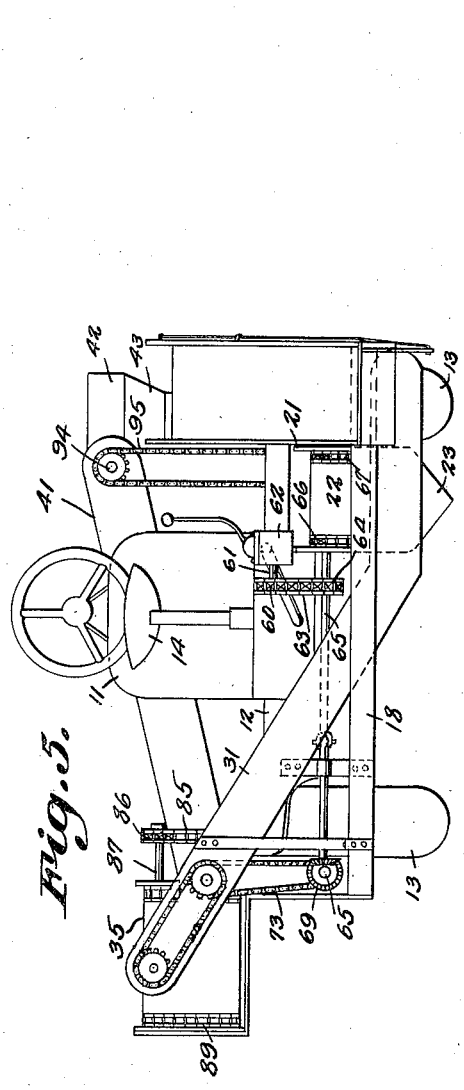
W. L. Snyder
INVENTOR
BY
ATTORNEYS.

Patented July 31, 1951

2,562,338

UNITED STATES PATENT OFFICE 2,562,338

POTATO HARVESTING ATTACHMENT FOR TRACTORS

William L. Snyder, Jerome, Idaho

Application May 15, 1947, Serial No. 748,255

1 Claim. (Cl. 209—125)

This invention relates to potato harvesting attachment for tractors, and more particularly to a device which may be wholly mounted and contained on a tractor, obviating the necessity of trailers or the like.

A primary object of this invention is the provision of an improved attachment for tractors adapted for the digging of potatoes, the removal of clods and vines therefrom, and the bagging thereof.

A further object of the invention is the provision of a device of this character particularly adapted for the removal of clods and dirt from potatoes prior to bagging.

Still another object of the invention is the provision of such a device which may be readily adapted to produce under those conditions where the potatoes are admixed with large quantities of earth in clods, or alternatively in cloddy spots in a normal field.

A further object of the invention is the provision of a device of this character wherein the potatoes may be sorted and disengaged from associated clods and vines prior to bagging.

A further object of the invention is the provision of such a device which is sturdy and durable in construction, reliable and efficient in operation, and relatively simple and inexpensive to manufacture, assemble, and attach to a tractor.

Still other objects reside in the combination of elements, arrangement of parts, and features of construction, all of which will be more fully pointed out hereinafter and disclosed in the accompanying drawings wherein there is shown a preferred embodiment of this inventive concept.

With the foregoing and other objects in view which will appear as the description proceeds, the invention consists of certain novel details of construction and combinations of parts, hereinafter more fully described and pointed out in the claim, it being understood that changes may be made in the construction and arrangement of parts, without departing from the spirit of the invention as claimed.

Referring to the drawings:

Figure 1 is a top plan view of one form of the device embodying features of the instant invention shown as attached to a tractor, certain concealed elements of the mechanism being indicated in dotted lines.

Figure 2 is a side elevational view of the device as shown in Figure 1, certain concealed parts being indicated in dotted lines.

Figure 3 is a front elevational view of the apparatus.

Figure 4 is a side elevational view of the device of the instant invention as viewed from the opposite side from Figure 2.

Figure 5 is a rear elevatonal view of the apparatus.

Similar reference characters refer to similar parts throughout the several views of the drawings.

Referring now to the drawings in detail, there is generally indicated at 10 a tractor of conventional design, including a body 11, a rear axle 12, rear wheels 13, a seat 14, and front wheels 15.

The tractor employed is preferably of the so-called three-wheeled type wherein the front wheels are spaced centrally of the device and relatively close together, while the rear wheels are widely spaced from the body.

Secured to the body in any desired conventional manner, such for example, as brackets 16 surrounding extending portions of rear axle 12 is a frame, which includes longitudinally extending supporting members 17, connected adjacent their extremities by transverse supporting members 18.

The frame is adapted to carry a potato digger, generally indicated at 20 (see Figure 2), and including side walls 21, within which is mounted a conveyor belt 22. The digger includes a pointed digging attachment 23 of any desired conventional type, pivotally mounted therein, the elevation of which is adapted to be controlled by an operating lever 24, suitably connected as by means of pivots 25, 26 and 27 to the point (see Figure 2).

Potatoes dug by the point 23, as well as clods and vines associated therewith, are moved rearwardly on the conveyor belt 22 and deposited on a conveyor belt 30, extending transversely across the rear of the tractor, and positioned in a supporting member including side walls 31, suitably carried by transverse frame member 18, which dislodges most of the loose dirt associated with the potatoes. Potatoes, clods and vines on the belt 30 are elevated and deposited on a longitudinally extending conveyor belt 35, extending longitudinally of the tractor, and rotated to move the potatoes forwardly thereof, in a manner to be more fully described hereinafter. Conveyor belt 35 is carried by a supporting member 36, suitably connected as by uprights 37 to the adjacent longitudinally extending frame member 17. Conveyor 35 serves as a sorting table for removal of vines and clods. Under certain conditions a hinged or pivoted board 38 may be suitably secured to the side wall of supporting member 36, for the purpose of deflecting the potatoes toward the inner side of the conveyor.

At its upper or forward end, the inner portion of conveyor belt 35 intersects a conveyor belt 40, carried by a supporting frame 41, secured to the forward transverse member 18, which elevates potatoes to a bagging mechanism 42, including a depending funnel 43, to which bags may be secured in any desired conventional manner, being supported on a base 44 carried by supporting members 17 and 18.

Means are provided for conveying the bag of potatoes to the ground, and include a longitudinally positioned trough or chute 50, suitably supported by the frame over the rear wheels 13 on the opposite side of the sorting conveyor 35, on the end of the device extending downwardly to the ground, being provided with a hinged door 51, spring biased to closed position as by a spring 52. The door may be controlled from a point adjacent the driver's seat as by means of a rope 53, secured by suitable eyes 54 to the sides of the chute, and extending to a projection 55 connected to the door 51, the arrangement being such that a pull on the rope will open the door, and upon release of the rope, spring 52 will reclose the door.

Means are provided for driving all the conveyor belts, and take the form, as best shown in Figure 1 of a sprocket 60 mounted on a shaft 61 extending from the power take-off 62 of the tractor. Sprocket 60 drives through a chain 63 a sprocket 64 mounted on a shaft 65 extending transversely across the rear of the tractor, the shaft 65 carrying at one end the sprocket 66, which, through chain 67 drives the conveyor belt 22 associated with the digger point 23.

Shaft 65 may be provided with a universal joint 68 if desired, and at its opposite end carries a beveled gear 69, in mesh with a corresponding beveled gear 70, carried by a longitudinally extending drive shaft 71 journalled in suitable bracket 72 carried by the frame. The shaft 71 is provided with a sprocket, which drives through a chain 73, a second sprocket 74 carried by a sub-axle 75, which in turn drives through sprockets 76 and chain 77 conveyor belt 30.

The opposite end of the shaft 71 carries the beveled gear 80, in mesh with the beveled gear 81 carried by a shaft 82 mounted in brackets 83 for rotation on the frame. The shaft 82 carries a sprocket 84 which drives through a chain 85 a sprocket 86 carried by an axle 87 which in turn through sprocket 88 and chain 89 drives conveyor belt 35.

The opposite end of the shaft 82 also carries a beveled gear 90 which meshes with the beveled gear 91, carried by a sub-axle 92 which drives through a chain 93 a sprocket 94 carried on an axle 95, the latter being provided with a conventional clutch mechanism 96 operable by a clutch handle 97, and adapted to rotate through a shaft 98 sprockets 99 which through chain 100 drive conveyor belt 40.

From the foregoing, it will now be seen that when the power take-off of a tractor is actuated all of the belts may be driven, the belts 22, 30 and 35 moving continuously while the take-off is actuated, and the belt 40 is being adapted to be energized and de-energized as desired for the bagging of potatoes.

From the foregoing, the operation of the device should now be readily understandable. Potatoes, clods and vines are first dug by the point 23, and lifted by the conveyor belt 22 to the belt 30. While traveling upwardly along the belt 30, loose earth is dislodged from the potatoes and vines, and travels downwardly against the travel of the belt or off the sides thereof to be cleared from the potatoes. The potatoes are then deposited together with their associated vines and clods on the conveyor 35, which travels longitudinally of the device, and here the clods and vines may be separated from the potatoes by the operating crew, the potatoes being positioned inwardly of the conveyor belt 35, and the vines and clods arranged and sorted along the outer side or thrown clear if desired. As the potatoes travel toward the conveyor belt 40, it will be seen that those on the inner side are deposited on the belt 40, while, due to the fact that the conveyor belt 40 does not extend the full width of the conveyor belt 35 the clods and vines on the outer side may be dropped to the ground. Potatoes are then carried upwardly along the conveyor belt 40 to the bagging mechanism, where they are suitably bagged, the bags then being carried to the trough or chute 50 and deposited along the ground in the rear of the vehicle.

The baffle or partition 38 is adapted to be utilized under those conditions where there are few clods, and is adapted to direct potatoes to the side of the elevator 35 nearest the tractor. Under these conditions, the clods and vines may be picked by hand from the potatoes and placed on the outer side of the elevator. It is to be noted that the separation of the clods and vines from the potatoes may be readily effected by the field crew merely by a raking motion of the hand, thus expediting the operation of the separation of the potatoes from earth clods and vines and similar debris.

From the foregoing, it will now be seen that there is herein provided an improved potato digging attachment for tractors, which accomplishes all the objects of this invention, and others, including many advantages of great practical utility and commercial importance.

As many embodiments may be made of this inventive concept, and as many modifications may be made of the embodiment hereinbefore shown and described, it is to be understood that all matter herein is to be interpreted merely as illustrative and not in a limiting sense.

What is claimed is:

A potato harvesting attachment for tractors embodying a rectangular frame fitted around and secured to a tractor, a plurality of inclined endless conveyors mounted on the rectangular frame operating at right angles with respect to each other at the sides and ends of the tractor, said endless conveyors having overlapping ends whereby material is delivered from one conveyor to another, the conveyor at one side of the tractor comprising a sorting table, an angularly disposed baffle extending inwardly and forwardly from the outer edge of the frame, overlying the sorting table at the receiving end thereof, one end of one of the conveyors underlying the adjacent end of the sorting table throughout only substantially one-half of the width of the sorting table, providing a clearance into which vines from the vegetables passing over the conveyors, are delivered, away from the machine.

WILLIAM L. SNYDER.

REFERENCES CITED

The following references are of record in the file of this patent:

UNITED STATES PATENTS

| Number | Name | Date |
|---|---|---|
| 674,602 | Cole | May 21, 1901 |
| 994,513 | Herbert | June 6, 1911 |
| 1,180,251 | Swanson | Apr. 18, 1916 |
| 1,218,532 | Dunblazier | Mar. 6, 1917 |
| 1,279,793 | Upton | Sept. 24, 1918 |
| 1,303,180 | Eberhardt | May 6, 1919 |
| 1,682,554 | Dahlman | Aug. 28, 1928 |
| 1,696,554 | Phelps | Dec. 25, 1928 |
| 1,749,205 | Allen | Mar. 4, 1930 |
| 2,027,840 | Rodin | Jan. 14, 1936 |
| 2,468,639 | Sample | Apr. 26, 1949 |